(12) United States Patent
Brennan (10) Patent No.: US 12,444,959 B2
(45) Date of Patent: Oct. 14, 2025

(54) CHARGE-STORAGE WORKSTATION SYSTEM AND METHOD FOR RECHARGEABLE-BATTERY-POWERED TOOLS

(71) Applicant: Bernard Brennan, Bogalusa, LA (US)

(72) Inventor: Bernard Brennan, Bogalusa, LA (US)

( * ) Notice: Subject to any disclaimer, the term of this patent is extended or adjusted under 35 U.S.C. 154(b) by 632 days.

(21) Appl. No.: 17/881,427

(22) Filed: Aug. 4, 2022

(65) Prior Publication Data
US 2024/0047983 A1 Feb. 8, 2024

(51) Int. Cl.
| | |
|---|---|
| *H01M 10/46* | (2006.01) |
| *B25H 3/00* | (2006.01) |
| *B62B 3/10* | (2006.01) |
| *B62B 5/00* | (2006.01) |
| *H02J 7/00* | (2006.01) |
| *H02J 50/40* | (2016.01) |

(52) U.S. Cl.
CPC .............. *H02J 7/0044* (2013.01); *B25H 3/00* (2013.01); *B62B 3/10* (2013.01); *B62B 5/00* (2013.01); *H02J 7/00032* (2020.01); *H02J 7/0048* (2020.01); *H02J 50/40* (2016.02); *B62B 2202/48* (2013.01)

(58) Field of Classification Search
CPC .... H02J 7/0044; H02J 7/00032; H02J 7/0048; H02J 7/0013; B25H 3/00; B25H 3/02; B62B 5/00; B62B 2202/48; B62B 3/10
USPC ................................. 320/107, 114, 115, 104
See application file for complete search history.

(56) References Cited

U.S. PATENT DOCUMENTS

| | | | |
|---|---|---|---|
| 2,640,724 A | 6/1953 | Sanders et al. | |
| 2,854,686 A | 10/1958 | Hansen | |
| 3,759,538 A | 9/1973 | Fabiano | |
| 4,457,527 A | 7/1984 | Lowery | |

(Continued)

FOREIGN PATENT DOCUMENTS

WO    WO-2019195838 A1 * 10/2019 ............. B62B 3/106

OTHER PUBLICATIONS

Youtube, "Mobile Tool Storage Workbench," youtu.be/dgGk6mkDYGg (last accessed Aug. 4, 2022).

(Continued)

*Primary Examiner* — Edward Tso
(74) *Attorney, Agent, or Firm* — KEATY LAW FIRM LLC; Thomas S. Keaty (57) ABSTRACT

A charge-storage workstation system and method for controlling and monitoring several different battery chargers, for notifying a user of the charged status of several different batteries, for eliminating power consumption by inactive battery chargers, and for safe convenient storage of rechargeable-battery-powered tools. A frame, broad-set legs, narrow-set legs, top surface, and skirt support the tools and the other components. Electric power is supplied through an electric supply cord to a main GFCI outlet and to charger outlets. Various battery chargers are plugged into the charger outlets through sensors which sense current drawn by the battery chargers. A charge controller-monitor senses the current drawn by each battery charger through the corresponding sensor and reports the charged status of each battery as specified by the user. Under user control, the charge controller-monitor can cut power to inactive battery chargers to reduce wasteful use of electric power.

10 Claims, 9 Drawing Sheets

(56) References Cited

U.S. PATENT DOCUMENTS

| | | | |
|---|---|---|---|
| 4,520,239 A | 5/1985 | Schwartz | |
| 4,542,909 A | 9/1985 | Littwin et al. | |
| 4,591,777 A | 5/1986 | McCarty et al. | |
| 4,718,741 A | 1/1988 | Nichoalds | |
| 4,759,560 A | 7/1988 | Virgulti | |
| 4,976,450 A | 12/1990 | Ellefson | |
| 4,989,291 A | 2/1991 | Parent | |
| 5,221,132 A | 6/1993 | Combs et al. | |
| 5,230,552 A | 7/1993 | Schipper et al. | |
| 5,361,915 A | 11/1994 | Cohen et al. | |
| 5,449,067 A | 9/1995 | Cannon | |
| D365,012 S | 12/1995 | Sather | |
| 5,590,749 A | 1/1997 | Wagner et al. | |
| 5,611,553 A | 3/1997 | Schoeman et al. | |
| 5,666,265 A | 9/1997 | Lutz et al. | |
| 5,738,423 A | 4/1998 | Alfaro | |
| 5,906,381 A | 5/1999 | Hovatter | |
| 5,917,694 A | 6/1999 | Denny | |
| 6,008,621 A | 12/1999 | Madison et al. | |
| 6,036,203 A | 3/2000 | Tyus et al. | |
| 6,050,660 A | 4/2000 | Gurley | |
| 6,095,156 A | 8/2000 | Smith | |
| 6,170,839 B1 | 1/2001 | Kizewski | |
| 6,218,796 B1 | 4/2001 | Kozlowski | |
| 6,454,064 B1 | 9/2002 | Cheng | |
| 6,488,224 B1 | 12/2002 | Hiebenthal | |
| 6,493,217 B1 | 12/2002 | Jenkins | |
| 6,601,930 B2 | 8/2003 | Tiramani et al. | |
| 6,702,608 B2 | 3/2004 | Brennan | |
| 6,802,336 B1 | 10/2004 | Holmquist | |
| 6,897,406 B2 | 5/2005 | Crisler et al. | |
| 7,111,852 B2 | 9/2006 | Woods et al. | |
| D531,804 S | 11/2006 | Pederson et al. | |
| 7,198,511 B2 | 4/2007 | Brennan | |
| 7,263,742 B2 | 9/2007 | Valentini | |
| 7,273,215 B1 | 9/2007 | Smith | |
| 8,322,732 B2 * | 12/2012 | McKay | A47B 77/08 |
| | | | 280/47.35 |
| 9,533,623 B2 | 1/2017 | Descoteaux | |
| 10,486,722 B2 * | 11/2019 | Alves De Moraes | B62B 3/10 |
| 2004/0121225 A1 | 6/2004 | Krieger et al. | |
| 2005/0011037 A1 | 1/2005 | Zhao et al. | |
| 2006/0006838 A1 | 1/2006 | Clarke | |
| 2007/0029746 A1 | 2/2007 | Brennan | |
| 2007/0182114 A1 * | 8/2007 | Fernandes | B65H 49/32 |
| | | | 280/47.35 |
| 2019/0002005 A1 | 1/2019 | Alves De Moraes et al. | |

OTHER PUBLICATIONS

Amazon, "Mythinglogic Garden Tool Organizer for Garage," www.amazon.com/Mythinglogic-Organizer-Garage-Yard-Organizers-Storage/dp/B08X1X9FQ5 (last accessed Aug. 4, 2022).

Killer Tools, "Cordless Tool Garage ART55," www.killertools.com/Cordless-Tool-Garage-ART55_p_43.html (last accessed Aug. 4, 2022).

Toolguyd, "Kobalt Charging Station and Tool Storage Wall Cabinet," www.toolguyd.com/kobalt-charging-station-and-tool-storage-wall-cabinet/ (last accessed Aug. 4, 2022).

Tractor Supply Co., "Montezuma 4-Bay Power Tool Organizer, MPSO-4B," www.tractorsupply.com/tsc/product/montezuma-4-bay-power-tool-organizer-mpso-4b# (accessed Aug. 4, 2022).

Bigtoolrack, "BigToolRack 5n1 Tool Holder," www.bigtoolrack.com/products/new-btr-5n1-tool-holder (last accessed Aug. 4, 2022).

* cited by examiner

CHARGE-STORAGE WORKSTATION SYSTEM AND METHOD FOR RECHARGEABLE-BATTERY-POWERED TOOLS

BACKGROUND OF THE INVENTION

This invention provides a charge-storage workstation system and method for controlling and monitoring several different battery chargers, for notifying a user of the charged status of several different batteries, for eliminating power consumption by inactive battery chargers, and for safe convenient storage of rechargeable-battery-powered tools.

Improvements in the technology of rechargeable batteries, electric motors, and electronic control circuits have driven an increase in the availability and the use of rechargeable-battery-powered tools. Rechargeable batteries are available in many different types and configurations from many different manufacturers or brands, and each different type, configuration, and brand of rechargeable battery usually requires a different, specific, sometimes proprietary battery charger to be used for recharging the different batteries. One reason for the differences among batteries and battery chargers is the result of many modern batteries being subject to damage, including explosion and fire, from being overcharged or being allowed to become undercharged. Such batteries are provided with built-in circuitry for protection and control, and different rechargeable batteries from different sources for different uses are likely to have different built-in circuitry. The battery charger for a particular rechargeable battery needs to be compatible with that battery's protection circuitry. The manufacturers and sellers of rechargeable batteries and battery-powered tools are aware of the potential liability associated with batteries which can explode or catch fire when recharged improperly, and therefore have some justification for offering batteries and battery-powered devices which require the use of a proprietary battery charger. Some brands offer systems with rechargeable batteries which are interchangeable among various tools in that same brand. However, even a single brand might offer different systems having different voltages and requiring different chargers. As a result, a user having several different rechargeable-battery-powered tools is most likely to need several different battery chargers.

Battery chargers usually draw alternating current (AC) at a certain voltage and amperage from an AC power source such as an electric mains power source, and provide direct current (DC) to the battery being recharged at a different voltage and amperage. Because of the need for protection circuitry, the battery charger also draws a much smaller amount of current for the operation of internal components, to operate indicator lights, and to maintain a standby state when not in active use. A battery charger can use a small but significant amount of power when not in active use. Even a very simple battery charger such as a transformer "wall wart" without extensive protection circuitry can waste power when not in active use. Where several different battery chargers each waste a small amount of power the total power wasted can become significant.

Some rechargeable-battery-powered tools have built-in rechargeable batteries, some with and some without built-in battery chargers. Other rechargeable-battery-powered tools have removable batteries and separate chargers. Most batteries are recharged during a time when the tool is not being used or is being stored. It is possible for tools, batteries, and chargers to become separated from each other if some system of recharging the batteries and storing the tools is not observed.

What is needed is a charge-storage workstation system and method for controlling and monitoring several different battery chargers, for notifying a user of the charged status of several different batteries, for eliminating power consumption by inactive battery chargers, and for safe convenient storage of rechargeable-battery-powered tools.

U.S. Pat. No. 9,533,623 for a "Modifiable Rack System," issued on Jan. 3, 2017 to inventor Timothy J. Descoteaux, provides for a modifiable rack system that can be connected to a vehicle such as a truck or a tractor, and includes a receptacle for holding a variety of items including materials and equipment. The rack system includes a variety of add-ons for organizing and retaining equipment, and a hinged tail gate for easy access. The rack system includes a trailer hitch so a rolling trailer, or the like, can be daisy-chained off the back end. Wheels can be mounted to the rack system so the rack system can used as a rolling cart. The rack system is able to withstand large forces during use because of a tow support spine, and associated structures, which impart tremendous strength.

U.S. Pat. No. 4,591,777 for a "Multi-Station Modular Charging System for Cordless Tools and Appliances," issued on May 27, 1986 to assignee Solid State Chargers Research & Development, provides for a multi-station charging system for charging batteries within a plurality of cordless tools, appliances or the like, each of which has at least one re chargeable battery therein. A plurality of modules, which act as charging stations, are arranged substantially adjacent to one another. Normally closed pairs of conductive contacts are provided in each of the modules. The electrical pairs of contacts in the modules are connected in a series circuit arrangement with each other. On one of the modules, electrical connection is provided to a single current regulated solid-state charging device which produces charging current pulses. The device may alternatively be in the one module. Each of the modules removably supports a respective tool or appliance and each tool or appliance has means for electrically connecting the respective battery therein within the series circuit arrangement and in series therewith only one wall outlet or AC power connection is required. Any combination of batteries per tool or appliance and any number of tools or appliances may be provided. Any number of the modules may be unoccupied. The modules are of standard construction, allowing charging of batteries or cells within many different tools and appliances provided with standardized connections.

US Publication No. 2006/0006838 for a "Portable Tool Storage Device With Power Supply Unit," published on Jan. 12, 2006 by inventor Michael Clarke, discloses a portable tool storage device having a power supply unit that comprises a rechargeable battery, an electrical connector means by means of which the rechargeable battery can be connected to an external source of electrical power for charging the rechargeable battery, charging circuitry operable to control the charging of said rechargeable battery when the power supply unit is connected to said source of electric power, and a power outlet means electrically connected to the rechargeable battery to permit power to be drawn from the rechargeable battery by an external device.

SUMMARY OF THE INVENTION

This invention provides a charge-storage workstation system and method for controlling and monitoring several different battery chargers, for notifying a user of the charged status of several different batteries, for eliminating power consumption by inactive battery chargers, and for safe convenient storage of rechargeable-battery-powered tools.

A frame, broad-set legs, narrow-set legs, top surface, and skirt support the tools and the other components. Electric power is supplied through an electric supply cord to a main GFCI outlet and to charger outlets. Various battery chargers are plugged into the charger outlets through sensors which sense current drawn by the battery chargers. A charge controller-monitor senses the current drawn by each battery charger through the corresponding sensor and reports the charged status of each battery as specified by the user. Under user control, the charge controller-monitor can cut power to inactive battery chargers to reduce wasteful use of electric power.

BRIEF DESCRIPTION OF THE DRAWINGS

Reference will now be made to the drawings, wherein like parts are designated by like numerals, and wherein.

DETAILED DESCRIPTION OF THE INVENTION

Figure 1:
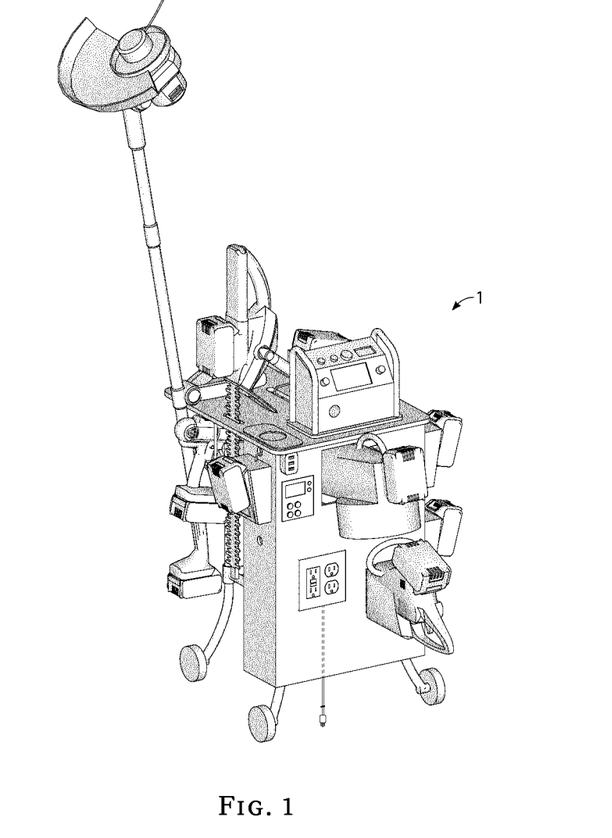
FIG. 1 is a front perspective view of the charge-storage workstation of the invention in use.
Figure 2:
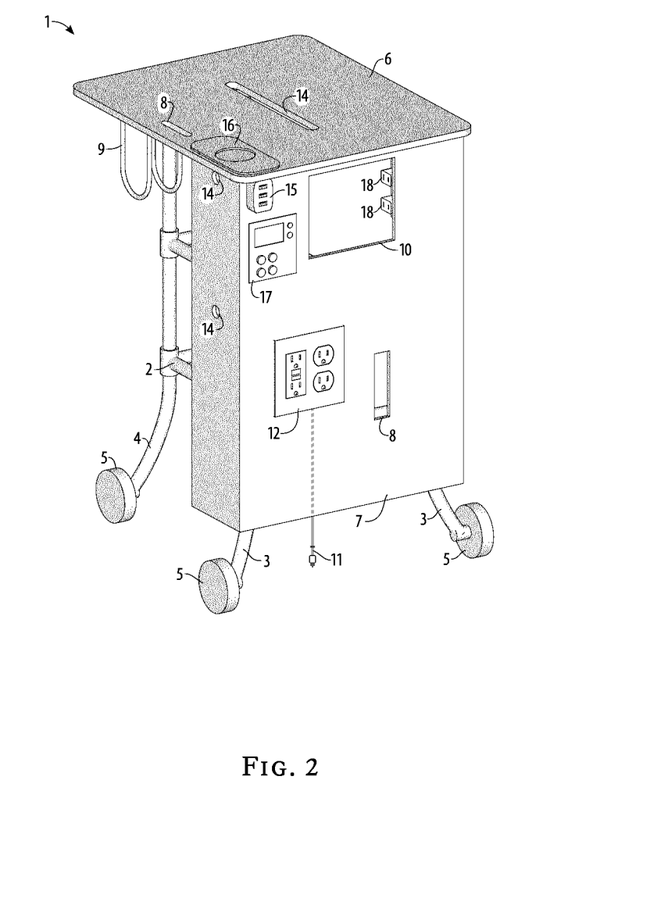
FIG. 2 is a front perspective view of the charge-storage workstation of the invention.
Figure 3:
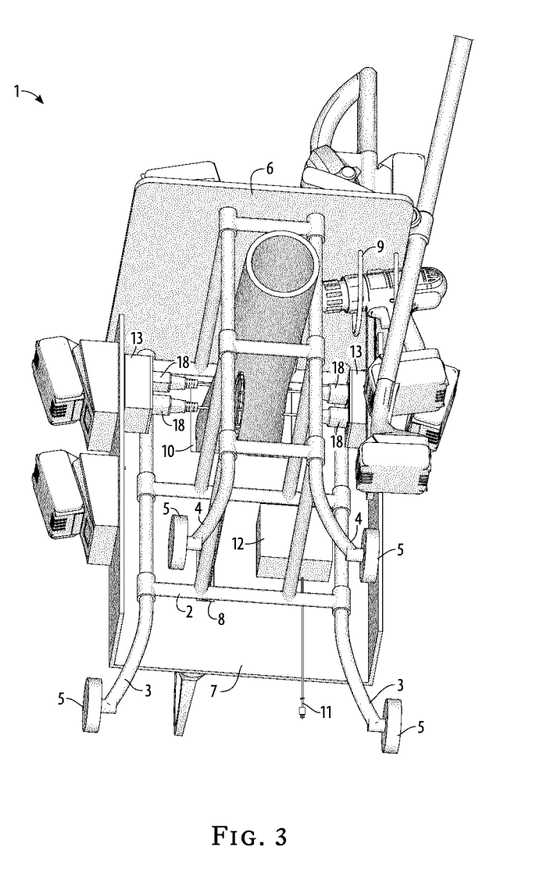
FIG. 3 is a back perspective view of the charge-storage workstation of the invention in use.
Figure 4:
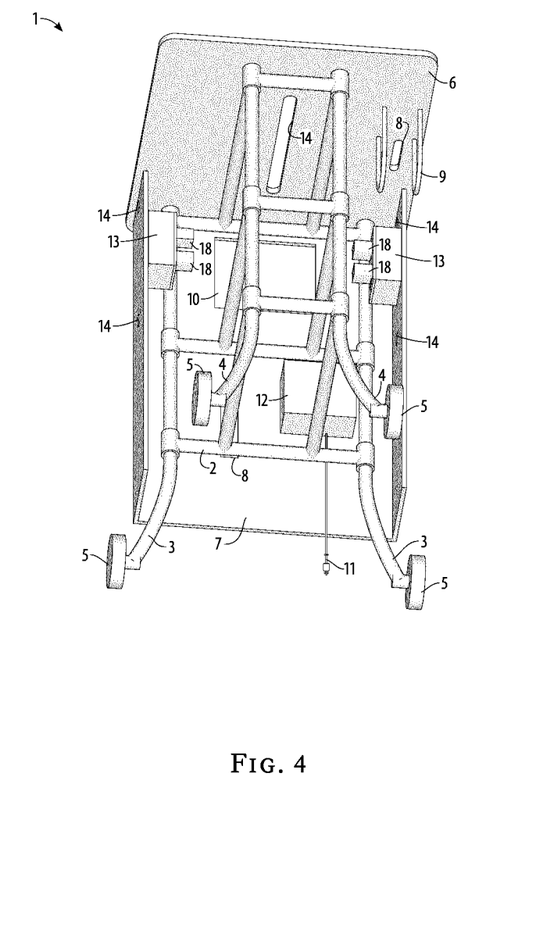
FIG. 4 is a back perspective view of the charge-storage workstation of the invention.

The charge-storage workstation 1 system and method of the invention is shown in use in use with a variety of rechargeable-battery-powered tools in FIG. 1 from the front and FIG. 3 from the back, and is shown without the tools in FIG. 2 from the front and FIG. 3 from the back. The charge-storage workstation 1 provides for storage of rechargeable-battery-powered tools and for charging of rechargeable tool batteries using various battery chargers appropriate for various types of tools and brands of tools, including proprietary battery chargers, with monitoring of the charging status of the various battery chargers, alerting the user about the charging status, and deactivation of specific battery chargers when appropriate to prevent wasteful use of electric power.

Figure 10:
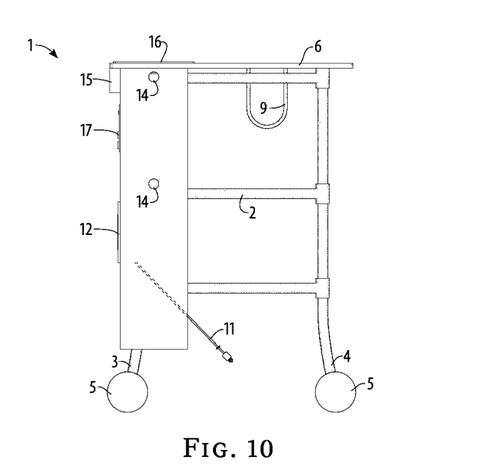
FIG. 10 is a left side view of the charge-storage workstation of the invention in use.
Figure 11:
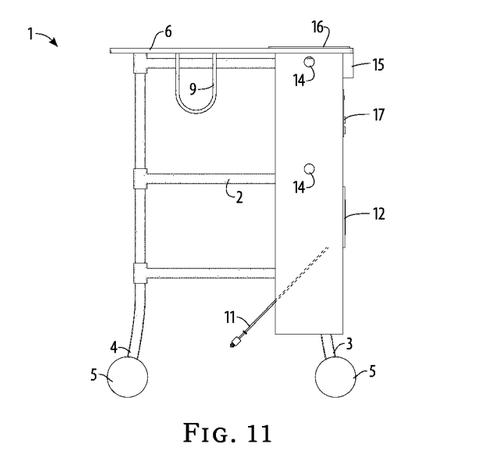
FIG. 11 is a right side view of the charge-storage workstation of the invention in use.

Referring additionally to side views FIG. 10 and FIG. 11, the charge-storage workstation 1 provides a frame 2 and two pairs of legs, broad-set legs 3 at the front and narrow-set legs 4 at the back. Optionally, wheels can be provided on either or both the broad-set legs 3 and narrow-set legs 4, as shown in the illustrated embodiment.

Figure 6:
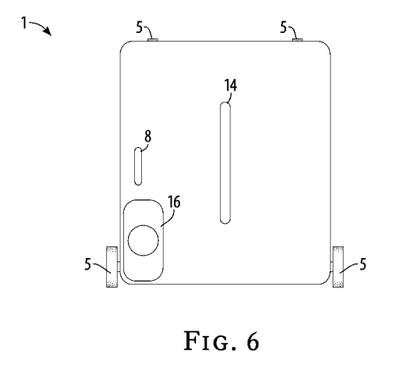
FIG. 6 is a top view of the charge-storage workstation of the invention in use.
Figure 7:
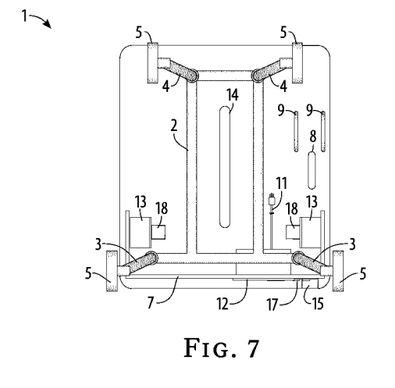
FIG. 7 is a bottom view of the charge-storage workstation of the invention in use.

Referring additionally to top view FIG. 6 and bottom view FIG. 7, the charge-storage workstation 1 provides a top surface 6 structure above the frame 2 for placement and storage of tools, chargers, and other items, as shown in FIG. 1 and FIG. 3.

Figure 8:
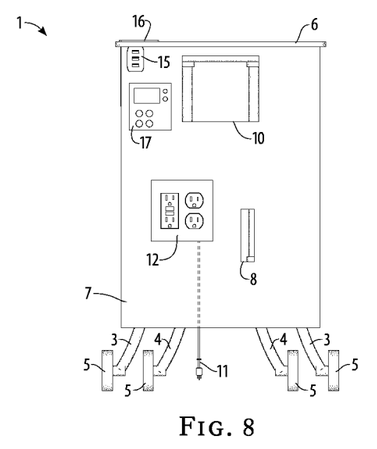
FIG. 8 is a front view of the charge-storage workstation of the invention in use.
Figure 9:
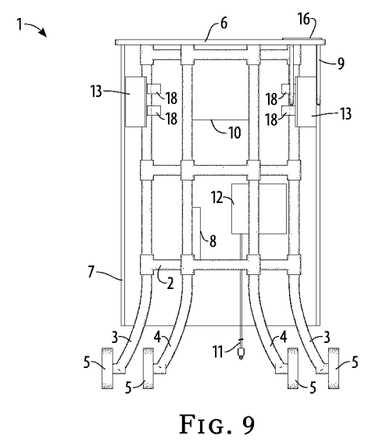
FIG. 9 is a back view of the charge-storage workstation of the invention in use.

Referring additionally to front view FIG. 8 and back view FIG. 9, the charge-storage workstation 1 provides a skirt 7 structure mounted in front of and extending over the broad-set legs 3. Battery chargers can be mounted upon the skirt 7, as shown in FIG. 1 and FIG. 3.

Blade slots 8 are provided in the top surface 6 and the skirt 7 to accommodate placement and storage of tools having long blades such as chain saws and hedge trimmers as illustrated. Hanging loops 9 are provided under and descending from the top surface 6 to accommodate placement and storage of tools such as the hand drill illustrated. A large opening 10 is provided to accommodate placement and storage of a larger tool such as the portable blower illustrated.

Electric power for operation of the charge-storage workstation 1 is provided through a provided electric supply cord 11. This electric power will usually be alternating-current mains power having voltage and frequency appropriate for the region of use, which will also be the voltage and frequency that battery chargers in that region are designed for. The electric supply cord 11 should be of durable construction and should have electrical conductors of sufficient size and composition to pass the needed current without generating heat and wasting power. The electric supply cord 11 can be a longer cord of a length allowing for convenient placement of the charge-storage workstation 1, or can be a shorter cord which can be extended with an appropriate extension cord.

Electric power for operation of the charge-storage workstation 1 is transmitted through the electric supply cord 1 to the main GFCI outlet 12 mounted on the skirt 7 of the charge-storage workstation 1, which provides a ground fault circuit interruption safety function for the entire charge-storage workstation 1 and provides power outlets which are not monitored and not intended for use with the battery chargers. The GFCI-protected power from the main GFCI outlet 12 is provided to one or more charger outlets 13 which are meant to power one or more battery chargers placed or mounted upon the charge-storage workstation 1. Cord passways 14 are provided in the top surface 6 and skirt 7 for the routing of power cords from the battery chargers to the charger outlets 13.

Optionally, in the preferred embodiment illustrated, a USB charge outlet 15 and a wireless charge pad 16 are also provided. The USB charge outlet can provide either or both the USB-A and USB-C socket configurations, and can provide only the generally safe and applicable 5 volts DC or can provide stepped-up power according to a standard protocol. The wireless charge pad can provide inductive power according to standard protocols.

Figure 5:
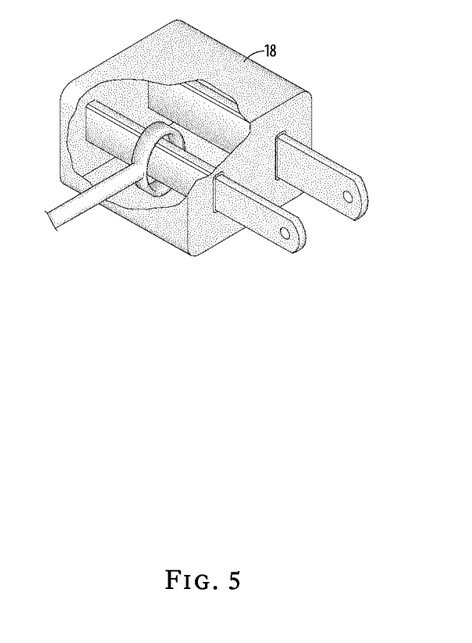
FIG. 5 is a cutaway detail view of the sensor of the charge-storage workstation of the invention.

The charge-storage workstation 1 provides a charge controller-monitor 17 for controlling and monitoring operations and for notifying the user of conditions such as the completion of charging by a particular battery charger, according to operating parameters set by the user. Each battery charger receives power through a sensor 18 associated with that particular battery charger. Referring to FIG. 5, each sensor 18 senses the current drawn by the plugged-in battery charger. As illustrated, the sensing of current can be accomplished by sensing a loop encompassing one but not both conductors. Although different, usually proprietary, battery chargers have different ways of signaling the charging or fully-charged status of a battery, any given battery charger will draw significantly more current when actively charging a battery than when not actively charging. By monitoring each sensor 18 for a significant rise in current drawn followed by a significant drop, the charge controller-monitor 17 can determine that the corresponding battery charger has charged and completed charging the battery. This completion of charging a particular battery can be signaled to the user through a display on the charge controller-monitor 17 and through a notification light or notification sound if such notification is requested by the user. Many battery chargers consume at least some small amount of power even when not actively charging a battery and even when no battery is mounted in the charger. The charge controller-monitor 17 through the sensors 18 can determine when particular battery chargers are inactive, and can cut power to the particular charger if the user has commanded the charge controller-monitor 17 to do so. In such a case, the user can restore power and reactivate a charger with a command to the charge controller-monitor 17. In the usual circumstances of having several different proprietary chargers, each receiving only occasional use, this feature can conserve electric power by preventing the large number of chargers from wasting small amounts of power adding up to a significant waste of power. The sensor 18 can be implemented as a separate unit, as illustrated, or can be incorporated within the enclosure surrounding the charger outlet 13.

Where a user is interested in the charged status of a particular battery, the user can enter into the charge controller-monitor an association of the particular battery with a particular battery charger associated with a particular sensor 18, and the user can enter into the charge controller-monitor 17 a command to activate the battery charger, to monitor the charged status of the battery by sensing of the current, and to notify the user of the charged status of the battery. The charge controller-monitor 17 provides a display and user-input means such as buttons or touch pads for such user input of operating parameters and commands. The charge controller-monitor 17 also provides the display and other indicators such as a light or a buzzer or speaker for making notifications or indications of status.

Figure 12:
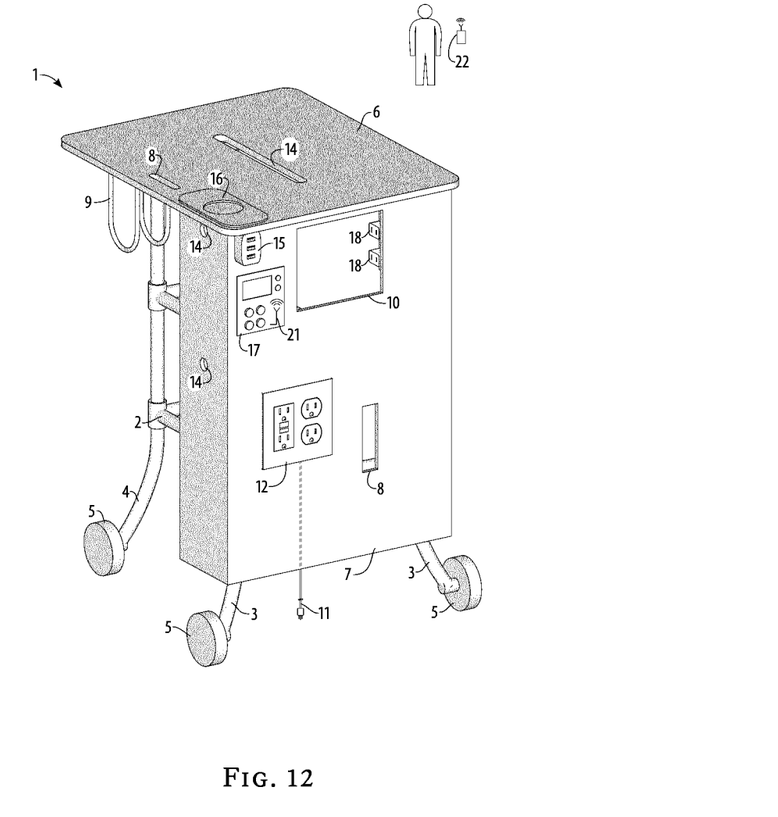
FIG. 12 is a front perspective view of a remote-control embodiment of the charge-storage workstation of the invention.

Referring to FIG. 12, a remote-control embodiment of the charge-storage workstation 1 further provides a communications link 21 integrated with the charge controller-monitor 17 and remote-control unit 22 allowing a user who is away from the charge-storage workstation 1 to monitor and control the charging of batteries. The communications link 21 can be a radio-frequency link such as WIFI or BLUETOOTH or a cellular telephone or data link, which are readily available and easy to implement, or can be a different radio-frequency link using allowable frequency bands or another link such as an optical link. The remote-control unit 22 can be implemented on proprietary equipment or can be implemented as an application for use on an existing communications device such as a smartphone, tablet, or computer. Using the remote-control unit 22, the user can remotely monitor and control the charge-storage workstation 1 through the charge controller-monitor 17. As an alternative, a monitor-only implementation can be provided in which the communications link 21 of the charge controller-monitor sends SMS or text messages or similar notifications, for example when the charging of a particular battery has been completed.

Many other changes and modifications can be made in the system and method of the present invention without departing from the spirit thereof. I therefore pray that my rights to the present invention be limited only by the scope of the appended claims.

I claim:

1. A charge-storage workstation system for rechargeable-battery-powered tools, the charge-storage workstation system comprising:
   (i) a frame;
   (ii) broad-set legs affixed to said frame at a front position;
   (iii) narrow-set legs affixed to said frame at a back position;
   (iv) a top surface affixed above said frame at a top position;
   (v) a skirt affixed in front of said frame and extending over said broad-set legs;
   (vi) blade slots in said top surface and said skirt adapted for placement and storage of tools having long blades;
   (vii) hanging loops descending from said top surface adapted for placement and storage of tools;
   (viii) a large opening in said skirt adapted to accommodate placement and storage of a larger tool;
   (ix) an electric supply cord;
   (x) a main GFCI outlet adapted to draw power from said electric supply cord and provide GFCI-protected power for operations;
   (xi) at least one charger outlet, each adapted to provide power to a battery charger placed or mounted upon said top surface or said skirt;
   (xii) at least one sensor, each corresponding to one said charger outlet, and each adapted to sense the current drawn by the corresponding battery charger; and
   (xiii) a charge controller-monitor adapted to monitor the charging activity of each battery charger through each corresponding said sensor, and to control the supply of electric power through each corresponding said charger outlet, and to make indications or notifications of status, according to operating parameters and commands set by a user.

2. The charge-storage workstation system of claim 1, further comprising wheels mounted on said broad-set legs.

3. The charge-storage workstation system of claim 1, further comprising wheels mounted on said broad-set legs and said narrow-set legs.

4. The charge-storage workstation system of claim 1, further comprising cord passways in said top surface and said skirt, adapted for routing of battery-charger power cords to at least one charger outlet.

5. The charge-storage workstation system of claim 1, further comprising a USB charge outlet on said top surface or said skirt.

6. The charge-storage workstation system of claim 1, further comprising a wireless charge pad on said top surface.

7. The charge-storage workstation system of claim 1, where said charge controller-monitor further comprises a display.

8. The charge-storage workstation system of claim 1, where said charge controller-monitor further comprises user-input means.

9. The charge-storage workstation system of claim 1, where said charge controller-monitor further comprises a communications link, and further comprising a remote-control unit.

10. A charge-storage workstation method comprising:
    (i) providing a charge-storage workstation system comprising:

(a) a frame;
(b) broad-set legs affixed to said frame at a front position;
(c) narrow-set legs affixed to said frame at a back position;
(d) a top surface affixed above said frame at a top position;
(e) a skirt affixed in front of said frame and extending over said broad-set legs;
(f) blade slots in said top surface and said skirt adapted for placement and storage of tools having long blades;
(g) hanging loops descending from said top surface adapted for placement and storage of tools;
(h) a large opening in said skirt adapted to accommodate placement and storage of a larger tool;
(i) an electric supply cord;
(j) a main GFCI outlet adapted to draw power from said electric supply cord and provide GFCI-protected power for operations;
(k) at least one charger outlet, each adapted to provide power to a battery charger placed or mounted upon said top surface or said skirt;
(l) at least one sensor, each corresponding to one said charger outlet, and each adapted to sense the current drawn by the corresponding battery charger; and
(m) a charge controller-monitor adapted to monitor the charging activity of each battery charger through each corresponding said sensor, and to control the supply of electric power through each corresponding said charger outlet, and to make indications or notifications of status, according to operating parameters and commands set by a user;
(ii) placing battery chargers on said top surface;
(iii) mounting battery chargers on said skirt;
(iv) connecting power cords from said battery chargers to said sensors and said charger outlets;
(v) inputting operating parameters and commands into said charge controller-monitor; and
where, for each battery charger and corresponding said sensor and said charger outlet, said charge controller-monitor senses the completion of charging through corresponding said sensor, and cuts power to corresponding said charger outlet.

\* \* \* \* \*